US008875387B2

(12) United States Patent
Youtsey

(10) Patent No.: US 8,875,387 B2
(45) Date of Patent: Nov. 4, 2014

(54) COAXIAL CABLE COMPRESSION TOOL

(75) Inventor: Timothy Lee Youtsey, Scottsdale, AZ (US)

(73) Assignee: PCT International, Inc., Mesa, AZ (US)

( * ) Notice: Subject to any disclaimer, the term of this patent is extended or adjusted under 35 U.S.C. 154(b) by 640 days.

(21) Appl. No.: 12/484,676

(22) Filed: Jun. 15, 2009

(65) Prior Publication Data

US 2010/0313412 A1 Dec. 16, 2010

(51) Int. Cl.
*B23P 19/00* (2006.01)
*H01R 43/042* (2006.01)

(52) U.S. Cl.
CPC .................................... *H01R 43/042* (2013.01)
USPC .................. 29/751; 29/747; 29/748; 29/753; 29/758; 29/761

(58) Field of Classification Search
USPC ........... 29/751, 282, 747, 748, 753, 758, 760, 29/761, 764, 816, 863
See application file for complete search history.

(56) References Cited

U.S. PATENT DOCUMENTS 508,314 A 11/1893 Hill
1,092,574 A 4/1914 Jannson
1,164,073 A 12/1915 Cunningham
1,328,087 A 1/1920 Le Chot
1,464,128 A 8/1923 Coes
1,571,148 A 1/1926 Sisolak
RE16,354 E 5/1926 Carlberg
1,613,976 A 1/1927 Bellows
1,613,981 A 1/1927 Carlberg
2,697,370 A 12/1954 Brooks
3,709,087 A 1/1973 Stone, Jr.
3,837,244 A 9/1974 Schera, Jr.
4,215,600 A 8/1980 Kesselman
4,345,375 A 8/1982 Hayward (Continued)

FOREIGN PATENT DOCUMENTS

CN 1701473 A 11/2005
CN 101162821 A 4/2008

(Continued)

OTHER PUBLICATIONS

Cable Pro, TechToolSupply.com, http://www.techtoolsupply.com/index.asp?PageAction=VIEWPROD&ProdID=223, 2 of 5 pages printed from the Internet on Jun. 8, 2008.

(Continued)

*Primary Examiner* — Thiem Phan
(74) *Attorney, Agent, or Firm* — Perkins Coie LLP

(57) ABSTRACT

A tool for compressing a connector onto a coaxial cable includes a pair of gates, a plunger for compressing the connector against the gates and onto the coaxial cable, and an actuator in communication with the gates and the plunger. When the actuator is moved from a first position to a second position, it causes the gates to move from an open to a closed position in which they retain the coaxial cable and brace the connector, and the plunger moves from a first position to a second position in which it engages the connector to compress the connector against the gates and onto the coaxial cable. When the actuator is moved back to its first position, the gates move to their open position thereby releasing the coaxial cable and the plunger moves to its first position thereby disengaging from the connector.

15 Claims, 13 Drawing Sheets

(56) References Cited

U.S. PATENT DOCUMENTS

| | | | | |
|---|---|---|---|---|
| 4,472,098 | A | 9/1984 | Kiefer | |
| 4,505,171 | A | 3/1985 | Chang | |
| 4,687,392 | A | 8/1987 | Bidwell | |
| 4,719,697 | A | 1/1988 | Schwartzman et al. | |
| 4,964,319 | A | 10/1990 | Chang | |
| 5,158,458 | A | 10/1992 | Perry | |
| 5,176,050 | A | 1/1993 | Sauer et al. | |
| 5,179,617 | A | 1/1993 | Stockman | |
| 5,299,474 | A | 4/1994 | Hohmann et al. | |
| 5,301,575 | A | 4/1994 | Mehlau et al. | |
| 5,392,508 | A | 2/1995 | Holliday et al. | |
| 5,415,065 | A | 5/1995 | McMills | |
| 5,487,220 | A | 1/1996 | Saitou | |
| 5,507,211 | A | 4/1996 | Wagner | |
| 5,595,219 | A | 1/1997 | Deuel et al. | |
| 5,615,587 | A | 4/1997 | Foerster, Jr. | |
| 5,743,131 | A | 4/1998 | Holliday et al. | |
| 5,746,298 | A | 5/1998 | Krivec et al. | |
| 5,797,300 | A | 8/1998 | Fairbanks | |
| 5,934,137 | A | 8/1999 | Tarpill | |
| 5,941,120 | A * | 8/1999 | Jee | 72/409.14 |
| 5,950,509 | A | 9/1999 | Doong | |
| 5,983,489 | A | 11/1999 | Jee | |
| 6,186,785 | B1 | 2/2001 | Rogers et al. | |
| 6,196,045 | B1 | 3/2001 | Thomas et al. | |
| 6,252,170 | B1 | 6/2001 | Korinek | |
| 6,293,004 | B1 | 9/2001 | Holliday | |
| 6,309,154 | B1 | 10/2001 | Higgins | |
| 6,349,625 | B1 | 2/2002 | Poganski | |
| 6,427,275 | B1 | 8/2002 | Hung | |
| 6,439,086 | B1 | 8/2002 | Bahr | |
| 6,499,358 | B1 | 12/2002 | Hogan et al. | |
| 6,536,103 | B1 | 3/2003 | Holland et al. | |
| 6,591,487 | B2 | 7/2003 | Chang | |
| 6,606,924 | B2 | 8/2003 | Chandler et al. | |
| 6,637,299 | B1 | 10/2003 | Steele | |
| 6,640,439 | B2 | 11/2003 | Losinger | |
| 6,708,396 | B2 | 3/2004 | Holliday | |
| 6,802,680 | B1 | 10/2004 | Rubenstein | |
| 6,817,272 | B2 | 11/2004 | Holland | |
| 6,832,533 | B1 | 12/2004 | Huang | |
| 6,848,920 | B2 | 2/2005 | Fox | |
| 6,928,907 | B2 | 8/2005 | Casabonne et al. | |
| 7,011,001 | B2 | 3/2006 | Knox et al. | |
| 7,024,970 | B2 | 4/2006 | Boman | |
| 7,028,393 | B2 * | 4/2006 | Wei | 29/761 |
| 7,029,305 | B2 | 4/2006 | Weidner | |
| 7,032,481 | B2 | 4/2006 | Li et al. | |
| 7,080,581 | B2 | 7/2006 | Reese | |
| 7,096,573 | B2 | 8/2006 | Holliday | |
| 7,120,997 | B2 | 10/2006 | Islam et al. | |
| 7,147,509 | B1 | 12/2006 | Burris et al. | |
| 7,152,309 | B2 | 12/2006 | Liao | |
| 7,159,494 | B2 | 1/2007 | Jamnia et al. | |
| 7,181,999 | B1 | 2/2007 | Skeels et al. | |
| 7,222,559 | B2 | 5/2007 | Wang | |
| 7,249,540 | B1 | 7/2007 | Hacker et al. | |
| 7,281,458 | B2 | 10/2007 | Chuang | |
| 7,299,543 | B2 | 11/2007 | Montena | |
| 7,299,725 | B2 | 11/2007 | Helstern et al. | |
| 7,347,129 | B1 | 3/2008 | Youtsey | |
| 7,395,592 | B2 | 7/2008 | Matsumura | |
| 7,544,086 | B1 | 6/2009 | Wells | |
| 7,798,849 | B2 | 9/2010 | Montena | |
| 7,837,501 | B2 | 11/2010 | Youtsey | |
| 7,975,578 | B2 | 7/2011 | Youtsey | |
| 7,984,553 | B1 | 7/2011 | Miller et al. | |
| 8,065,940 | B2 | 11/2011 | Wilson et al. | |
| 8,468,688 | B2 | 6/2013 | Montena et al. | |
| 8,490,525 | B2 | 7/2013 | Wilson et al. | |
| 8,752,282 | B2 | 6/2014 | Wilson et al. | |
| 2002/0174538 | A1 | 11/2002 | Chang | |
| 2002/0194726 | A1 | 12/2002 | Chang | |
| 2003/0051337 | A1 | 3/2003 | Holliday | |
| 2005/0020129 | A1 | 1/2005 | Dykstra et al. | |
| 2005/0161246 | A1 | 7/2005 | Khemakhem et al. | |
| 2006/0021479 | A1 | 2/2006 | Reese | |
| 2006/0143904 | A1 | 7/2006 | Holliday | |
| 2006/0150784 | A1 | 7/2006 | Hsieh | |
| 2006/0179981 | A1 | 8/2006 | Cutler et al. | |
| 2006/0236825 | A1 | 10/2006 | Chiou et al. | |
| 2006/0240709 | A1 | 10/2006 | Montena et al. | |
| 2007/0039426 | A1 | 2/2007 | Chuang | |
| 2007/0251085 | A1 | 11/2007 | Holliday et al. | |
| 2008/0087145 | A1 | 4/2008 | Youtsey | |
| 2008/0304907 | A1 | 12/2008 | Figge et al. | |
| 2009/0049962 | A1 | 2/2009 | Cutler | |
| 2009/0133980 | A1 | 5/2009 | Swaim et al. | |
| 2010/0018040 | A1 | 1/2010 | Bradley | |
| 2010/0022120 | A1 | 1/2010 | Bradley | |
| 2010/0294094 | A1 | 11/2010 | Wilson et al. | |
| 2010/0307299 | A1 | 12/2010 | Nino et al. | |
| 2011/0056341 | A1 | 3/2011 | Lai | |
| 2011/0162492 | A1 | 7/2011 | Wilson et al. | |

FOREIGN PATENT DOCUMENTS

| | | | |
|---|---|---|---|
| DE | 202008000753 | U1 | 3/2008 |
| EP | 0471977 | A2 | 2/1992 |
| TW | 570415 | U | 1/2004 |
| TW | I297633 | B | 6/2008 |
| WO | WO-03/056728 | A1 | 7/2003 |
| WO | WO-2010/135598 | A1 | 11/2010 |
| WO | WO-2012112580 | A1 | 8/2012 |

OTHER PUBLICATIONS

International Search Report and Written Opinion for PCT/US10/35679, mailed Sep. 1, 2010, Applicant: PCT International, Inc., 13 pages.

U.S. Non-Final Office Action issued for U.S. Appl. No. 12/470,430, mailed Jan. 19, 2011, 11 pages.

U.S. Non-Final Office Action issued for U.S. Appl. No. 12/470,430, mailed May 26, 2011, 8 pages.

International Search Report and Written Opinion for PCT/US2012/025090, mailed May 25, 2012, Applicant: PCT International, Inc., 10 pages.

U.S. Non-Final Office Action issued for U.S. Appl. No. 13/026,571, mailed Jan. 4, 2013, 17 pages.

U.S. Non-Final Office Action issued for U.S. Appl. No. 13/607,542, mailed Sep. 27, 2013, 8 pages.

Office Action for Chinese Patent Application No. 201080031905.5, mailed Oct. 8, 2013, official version and translation, 20 pages.

Office Action for Taiwanese Patent Application No. 098115228, mailed Jul. 22, 2013, 5 pages.

Office Action for Chinese Patent Application No. 200910302430.8, mailed Jan. 11, 2012, 6 pages.

* cited by examiner

COAXIAL CABLE COMPRESSION TOOL

FIELD OF THE INVENTION

The present invention relates to coaxial cable compression tools, and, more particularly, to compression tools for compressing coaxial cable connectors onto the cable.

BACKGROUND OF THE INVENTION

F-type connectors (or "F-connectors" or "female F-connectors") are used on most radio frequency (RF) coaxial cables to interconnect TVs, cable TV decoders, VCR/DVD's, hard disk digital recorders, satellite receivers, and other devices. F-type connectors have a generally standard design, typically using a 7/16 inch hex nut as a fastener.

One form of F-type connector is the compression connector. Among other things, F-type compression connectors provide a generally weather-resistant electrical connection without the need for soldering. Compression F-type connectors can be used with different sizes and types of coaxial cable. For example, smaller compression connectors are used on smaller diameter cables (e.g., series 6 or 59 cable) while larger compression connectors are used with larger diameter cables (e.g., series 7 or 11 cable). F-type compression connectors are typically compressed onto the end of a coaxial cable using a compression tool.

A variety of conventional tools are available to compress F-type compression connectors. Some such tools do not adequately retain the coaxial cable, which can make it awkward and difficult for a user to simultaneously maneuver the coaxial cable and connector into position to compress the connector onto the cable. Some conventional tools also do not adequately brace the rear of the connector as it is being compressed onto the cable, which can lead to the back of the connector being deformed and/or improperly positioned on the cable.

Some conventional tools provide mechanisms to retain the cable in place during compression, but also render the tool awkward to manipulate. For example, some such tools require a user to simultaneously (1) hold and operate the tool, (2) insert/remove the cable and connector, and/or (3) manipulate the mechanism retaining the tool. Among other things, this manner of operation increases the overall time it takes for a user to compress a connector onto a cable, and can result in the connector being improperly compressed onto the cable. In some circumstances, such as when the user is working on a ladder or in close quarters (such as an attic or crawlspace) it may be impossible for a user to properly manipulate the tool in order to compress the connector onto the cable.

Additionally, many conventional tools are configured to only handle one size of coaxial cable and connector. For example, a user wishing to compress an F-type connector onto a series 6 or series 59 cable must often use an entirely different tool to compress a connector onto a series 7 or series 11 cable.

Furthermore, some conventional compression tools require a significant amount of cable (after about 1-1½ inches) to extend into the tool to function properly. This can make it difficult to attach a connector if the required amount of cable is not available. For example, if the cable does not extend the appropriate distance from a wall or wall plate, it may be difficult or impossible to compress a connector on the end of the cable. The present invention addresses these problems.

SUMMARY OF THE INVENTION

The present invention allows a user to compress F-type connectors onto a coaxial cable. A tool for compressing a connector onto a coaxial cable according to the present invention comprises a connection station that receives the end of a coaxial cable with a connector positioned on it. The station includes (1) a pair of gates having an open position and a closed position, (2) a plunger for compressing the connector against the gates and onto the coaxial cable, the plunger having a first position and a second position, and (3) an actuator in communication with the gates and the plunger, the actuator having a first position and a second position.

When the actuator is moved from its first position into its second position, it causes (a) the gates to move to their closed position to grip and retain the coaxial cable and brace the connector, and (b) the plunger to move to its second position, whereby it compresses the connector against the gates and onto the coaxial cable. When the actuator is moved back to its first position, it causes the gates to release the coaxial cable and causes the plunger to move to its first position where it disengages from the connector.

A coaxial compression tool according to the present invention may also have a plurality (preferably two) of connector compression stations, e.g., a first compression station and a second compression station, wherein each station preferably has the same general structure as described herein. The first compression station is preferably configured to handle one size of cable (e.g., series 6 or 59) while the second compression station is preferably configured to handle another size of cable (e.g., series 7 or 11). This allows a user to compress connectors onto different sizes of cable using a single tool. The different compression stations can be on different ends or the same end of a tool according to the invention.

If a second compression station were provided, it would function in the same manner as previously described with respect to the first compression station. Thus, in a preferred embodiment, moving the actuator between its first and second position simultaneously moves the gates and plunger of both the first compression station and the second compression station, although typically only one compression station would be used at a time to compress a connector onto a coaxial cable.

Both the foregoing summary and the following detailed description are exemplary only and are not restrictive of the invention.

DETAILED DESCRIPTION OF PREFERRED EMBODIMENTS

One preferred compression tool 100 according to the present invention is depicted in FIGS. 1-10. The tool 100 as shown includes a first end 100A having a first compression station 110, a second end 100B having a second compression station 130, and an actuator 150. Although shown with two compression stations, a tool according to the invention may have only one, or more than two, compression stations.

The tool 100 may be comprised of any suitable material and is preferably comprised of different types of steel.

Figure 1:
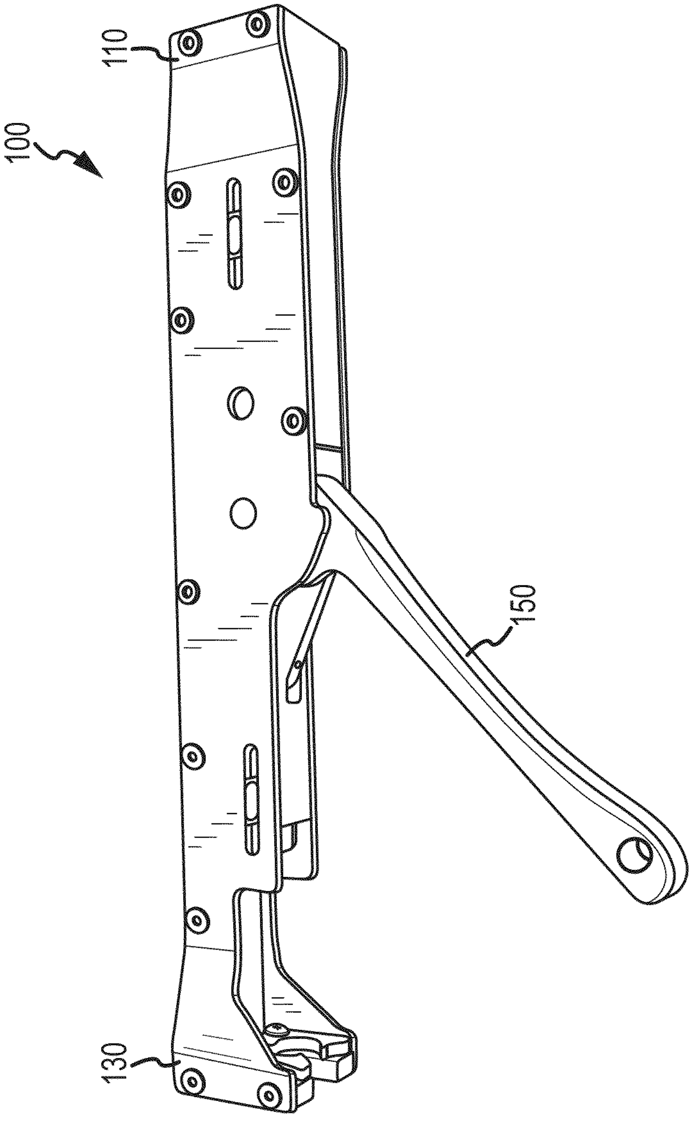
FIG. 1 is a side view of an exemplary coaxial compression tool according to the present invention.
Figure 2:
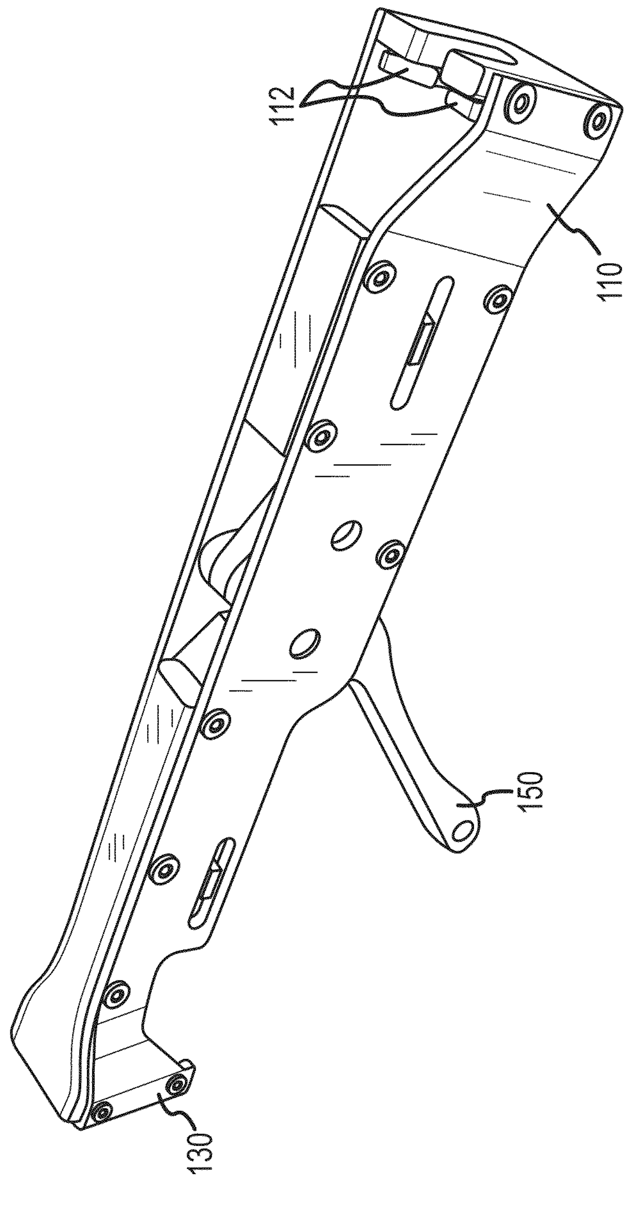
FIG. 2 is a top perspective view of the tool of FIG. 1.
Figure 9:
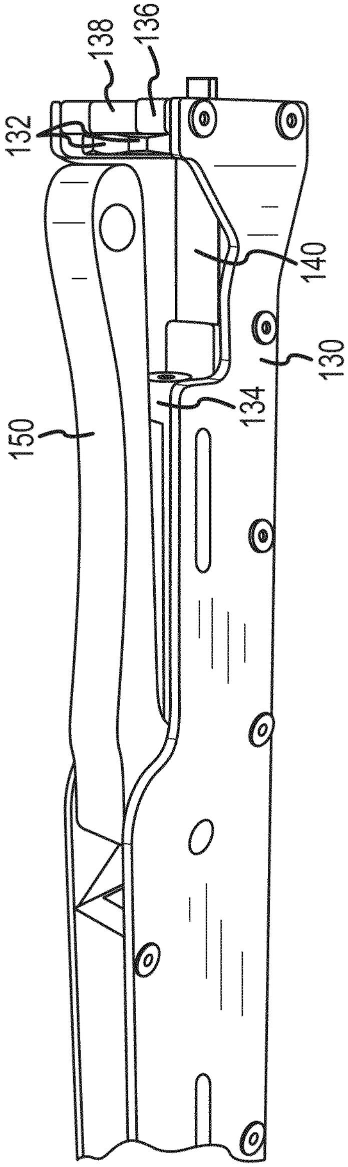
FIG. 9 is a side and bottom view of the tool of FIG. 1, illustrating the actuator in its second position.
Figure 10:
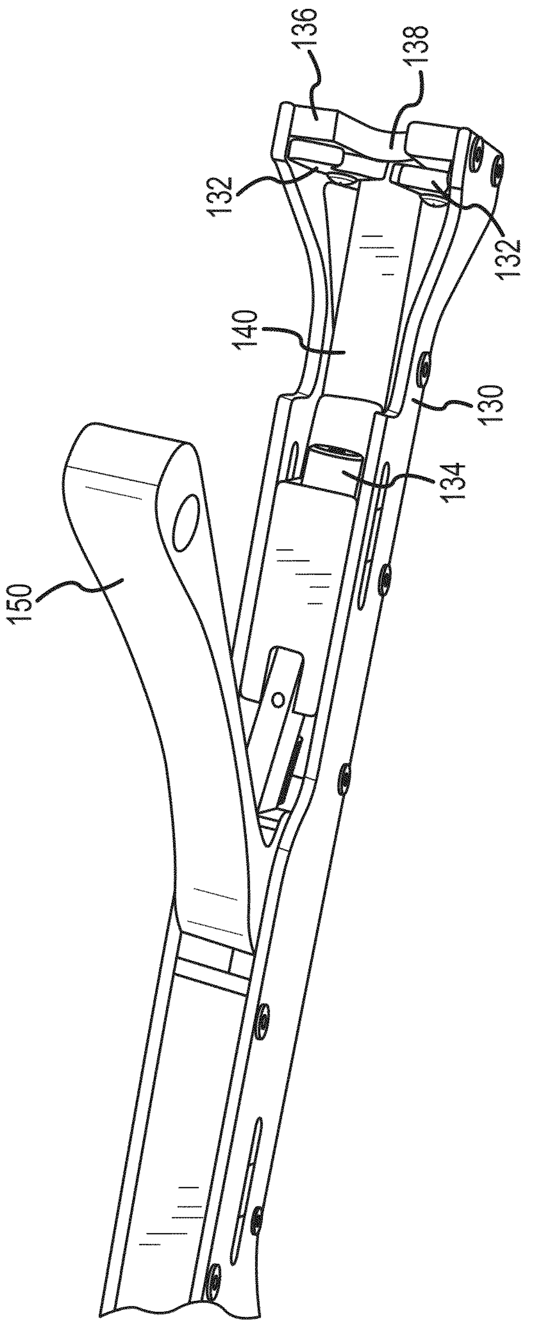
FIG. 10 is a bottom perspective view of the tool of FIG. 1, illustrating the actuator in its first position.
Figure 11A:
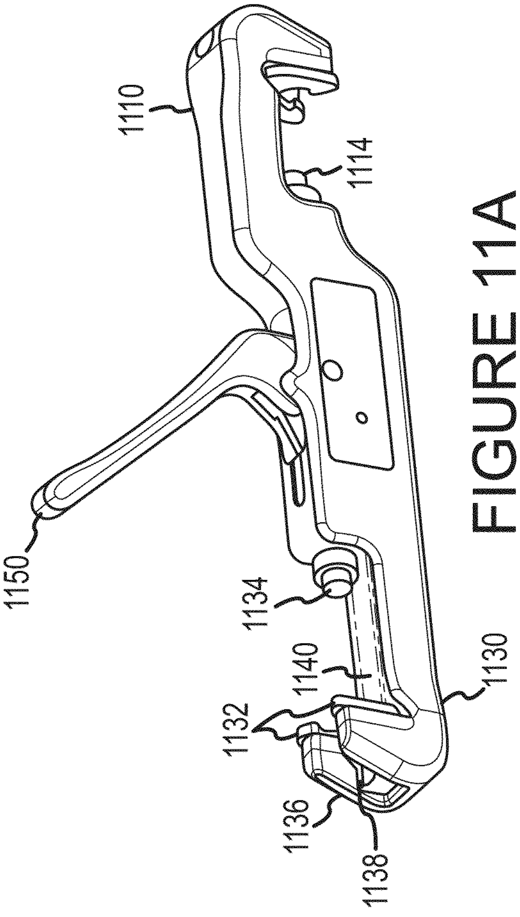
FIG. 11A shows the tool of FIG. 1 with the actuator in its first position.
Figure 11C:
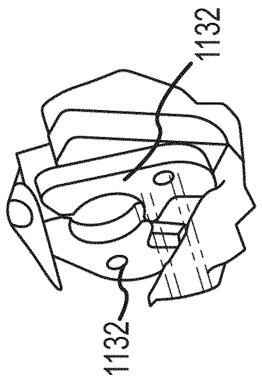
FIG. 11C shows the end of the tool shown in FIG. 11A with the gates in their closed position.
Figure 11B:
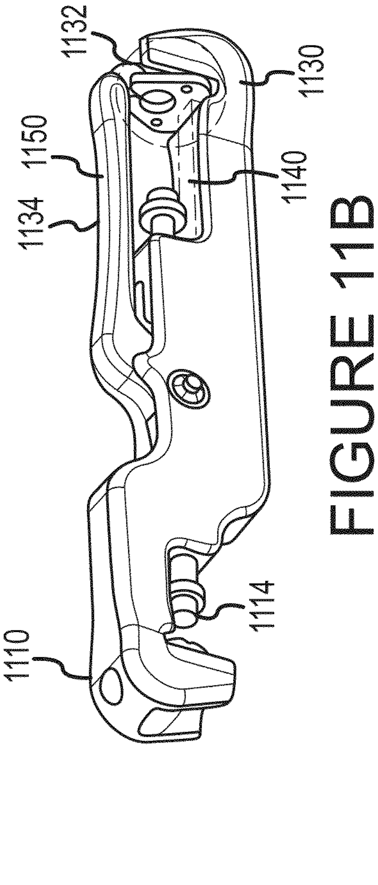
FIG. 11B shows the tool of 11A with the actuator in its second position.
Figure 12A:
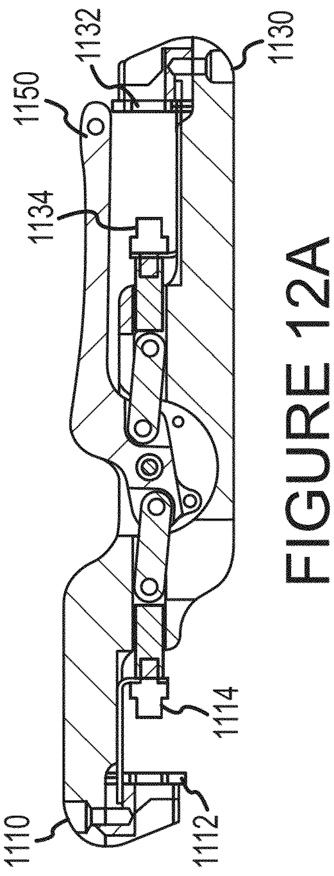
FIG. 12A shows a cross-sectional view of the tool of FIG. 11A when the actuator is in its second position.
Figure 12B:
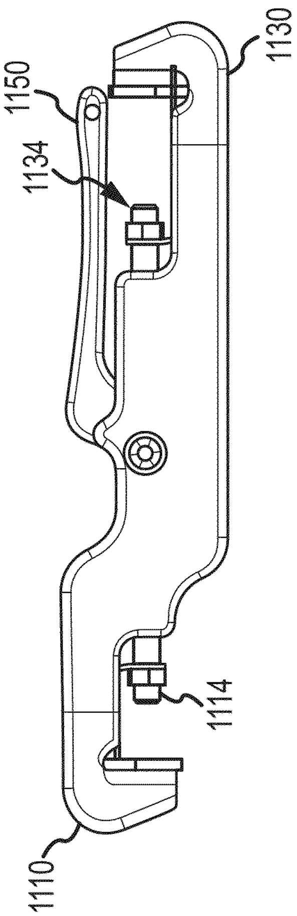
FIG. 12B is a side view of the tool of FIG. 11A when the actuator is in the second position.

The tool 100 enables, with two compression stations, a user to compress one size (e.g., series 9 and 56) of connectors using the first compression station 110, and to compress another size (e.g., series 7 and 11) of connectors using the second compression station 130. The actuator 150 can be moved from a first (or open) position, as shown in FIGS. 1 and 11A, to a second (or closed) position as shown in FIGS. 9 and 11B. Moving the actuator 150 to the second position compresses a connector onto a cable using either the first compression station 110 or second compression station 130. The cable and connector are simultaneously retained and compressed together by the movement of the respective gates and plunger in response to movement of the actuator 150 to the second position. Movement of the actuator 150 back to the first (open) position then releases the cable and connector.

The first compression station 110 includes a pair of gates 112 at the distal end 110A of the compression station 110, a plunger 114 at the proximal end of the compression station 110, and an end piece 116. The gates 112 have an open position (shown in FIG. 5) and a closed position (shown in FIG. 6) in which they retain and grip coaxial cable and brace the rear of the connector as it is compressed by the plunger onto the cable.

The gates 112 may be of any suitable size, shape, and configuration. In the preferred embodiment, each gate 112 includes a semi-circular portion. When the actuator 150 is moved into the second (or closed) position, the gates 112 move to their closed position, and the semi-circular portion of each gate 112 combines to form a substantially circular opening that at least partially surrounds (and retains) the coaxial cable as shown in FIG. 11C. The gates 112 can be configured to hold the cable stationary, or to allow the cable to move laterally. In this embodiment, gates 112 of compression station 110 are sized to accommodate a series 6 or 59 coaxial cable. The gates 112 may be configured to retain any other size or type of cable.

The gates 112 may be of any suitable thickness and formed from any suitable material. The gates 112 are preferably configured to provide a stable and uniform brace for the connector to allow the connector to be compressed properly onto the cable without deforming the connector. In the preferred embodiment, the gates 112 are approximately 0.100 inches thick and are formed from stainless steel.

Figure 3:
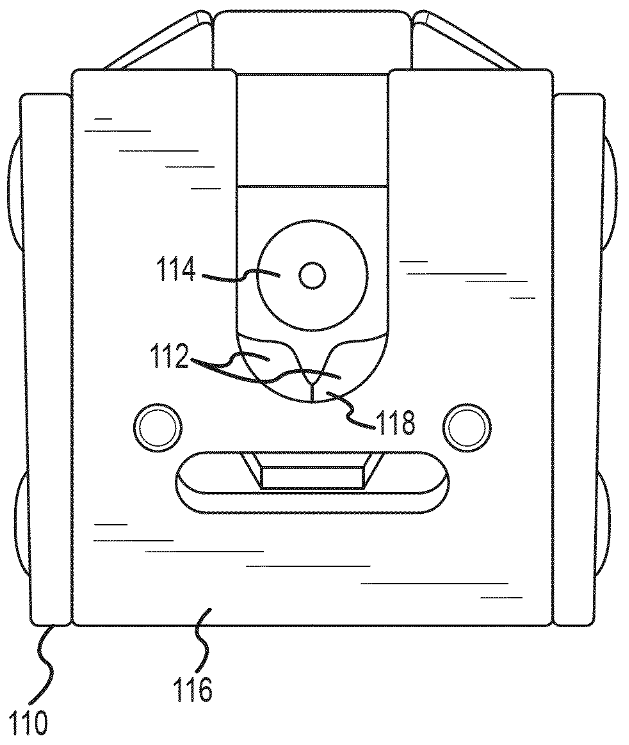
FIG. 3 is an end view of the tool of FIG. 1.
Figure 4:
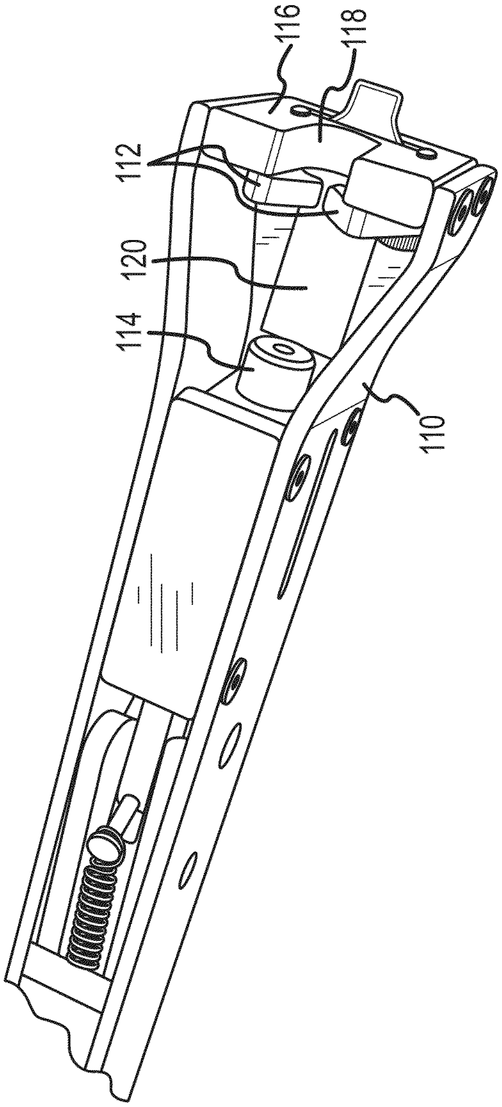
FIG. 4 is a top view of the tool of FIG. 1.

The plunger 114 compresses the connector onto the coaxial connector when the actuator 150 is moved to its second position. The plunger 114 may be of any suitable size, shape and configuration to compress a connector onto a coaxial cable. In the preferred embodiment, as best seen in FIGS. 3 and 4, the plunger 114 is cylindrical and comprises an opening in its center to receive the central conductor (usually comprised of a copper wire) of the coaxial cable without damaging or bending the conductor. When the actuator 150 is moved from its first (open) position to its second (closed) position, the gates 112 close about the cable (as described above) and the plunger 114 is moved towards the gates 112, pressing on the interior of the connector and compressing it onto the coaxial cable. When the actuator 150 is moved back to its first position, the gates 112 open and the plunger 114 retracts and disengages from the connector, allowing the user to remove the cable (with connector now attached thereto) from the tool 100.

Figure 5:
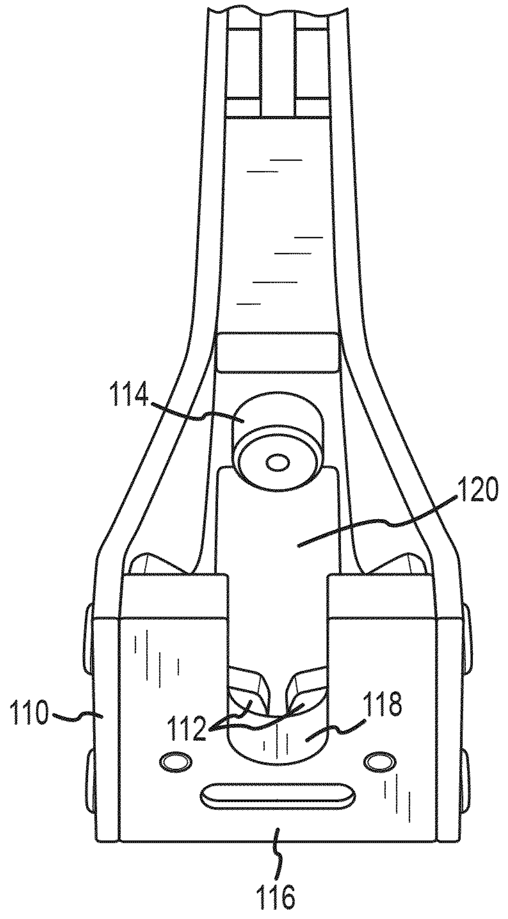
FIG. 5 is a front frontal perspective end view of the tool in FIG. 1, illustrating the actuator in its first position.
Figure 6:
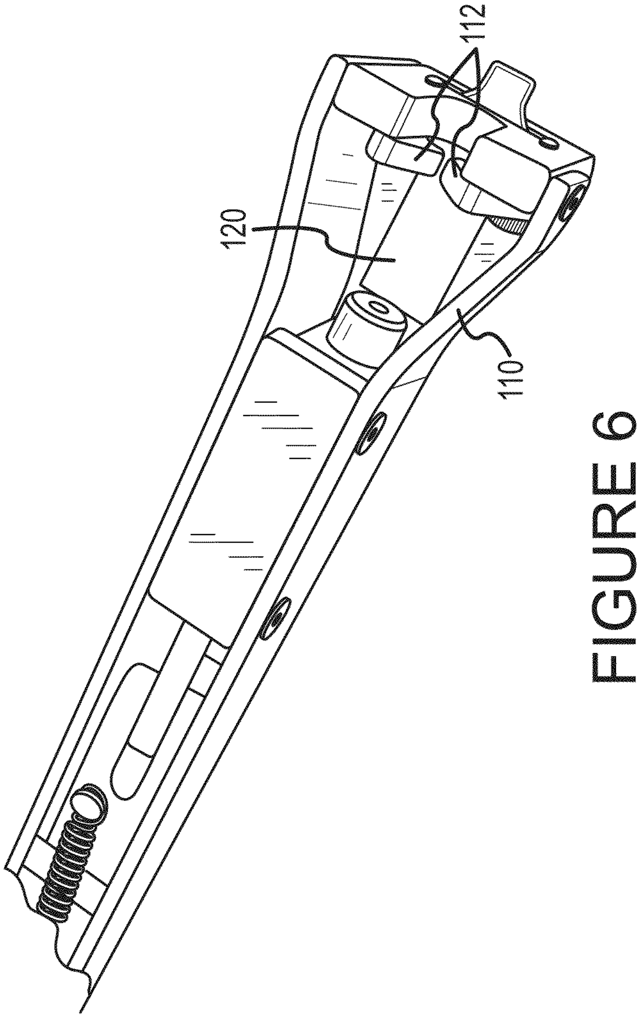
FIG. 6 is a top view of the tool of FIG. 1 illustrating the actuator in its second position.
Figure 7:
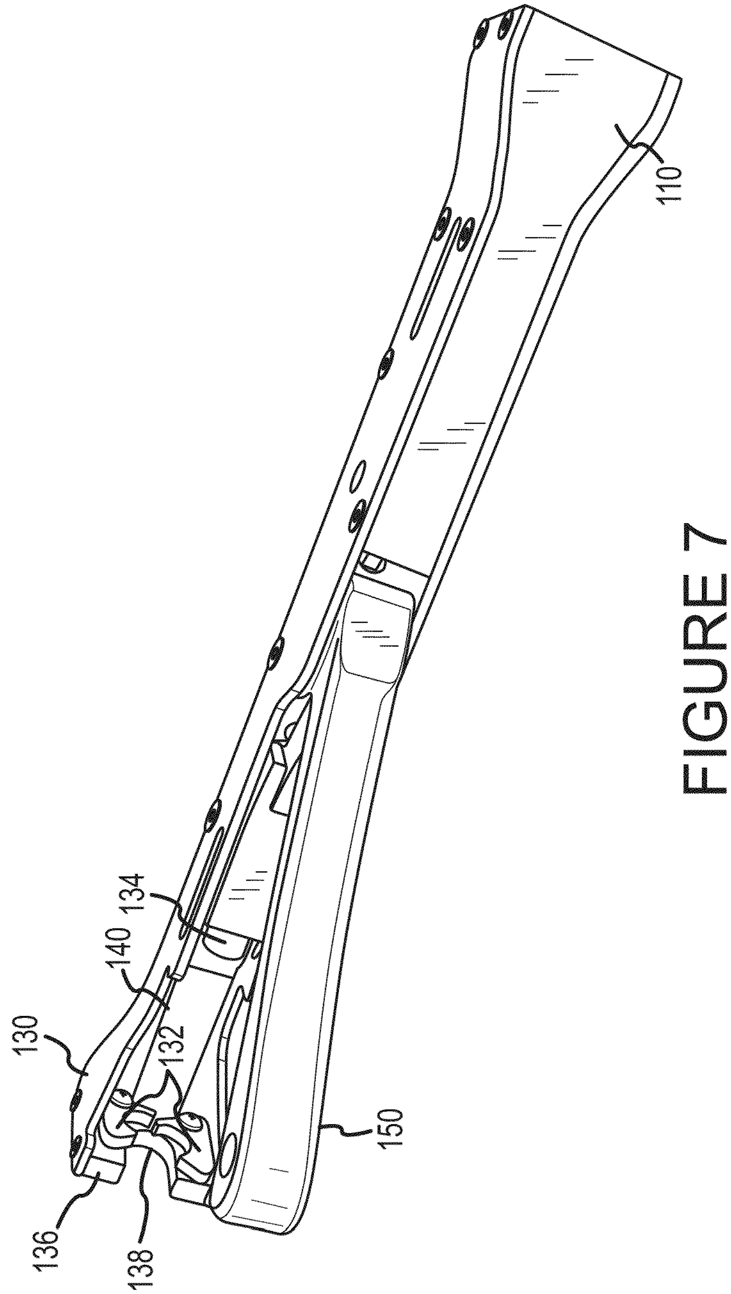
FIG. 7 is a bottom perspective view of the tool of FIG. 1.
Figure 8:
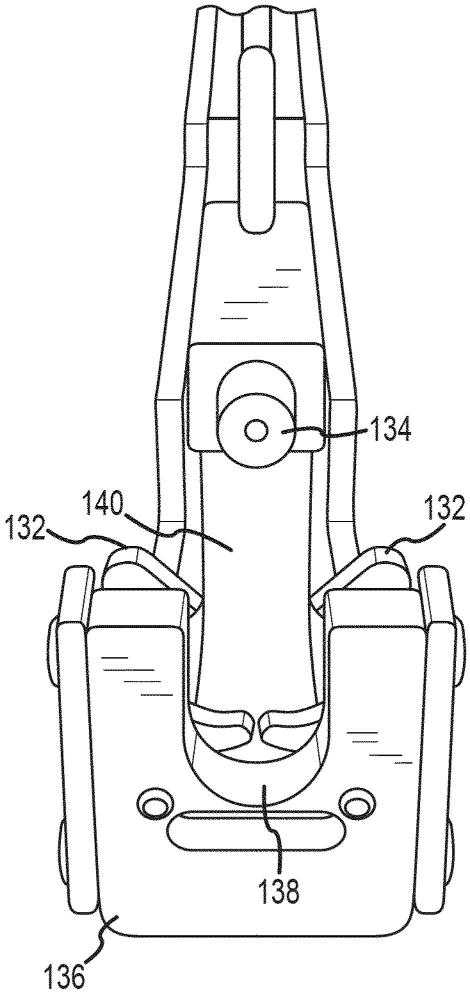
FIG. 8 is an end perspective view of the tool of FIG. 1.

A compression station of tool 100 may include an end piece 116, as shown in FIGS. 3-5. The end piece 116 may be of any suitable size, shape, and configuration, and may be formed from any desired material. In the preferred embodiment, the end piece 116 is formed from stainless steel and is about ¼ inch thick, though the end piece 116 may have any other suitable dimension, such as a thickness of 0.100 inch. The end piece 116 is distal to the gates 112 and further braces the rear of the connector as it is compressed onto the cable. The end piece 116 includes an opening 118 to receive and guide the cable and, in the preferred embodiment, the opening 118 is "U"-shaped. When the actuator 150 is moved into the first position, closing the gates 112 about the cable, the semi-circular portions of the gates align with the U-shaped opening 118 to define a substantially circular opening through which the cable is received and retained.

In addition to helping the gates 112 brace the rear of the connector as it is compressed onto the cable, the end piece 116 may be configured for any other suitable purpose. In the present embodiment for example, each gate 112 is pivotably attached to the end piece 116, allowing the gates 112 to freely close (when the actuator 150 is moved to the second position) and open (when the actuator 150 is moved to the first position).

The compression station 110 defines a channel 120. The plunger 114 is located at the proximal end of the channel, while the gates 112 and end piece are located at the distal end of the channel 120. The channel 120 receives the connector and cable (usually with the connector positioned on the cable), and helps to align the connector, cable, and plunger 114 prior to compression. The channel 120 can be of any suitable size, shape, and configuration. In the preferred embodiment, the channel 120 is about ⅝ inches wide and about 1.5 inches long. The channel 140, by comparison, is about ⅝ inches wide and about 2.5 inches long to accommodate a larger connector than channel 120.

In operation, the connector is positioned on the cable, and is placed in the channel with the fastener of the connector facing the plunger 114. The actuator 150 is moved from its first position to its second position, the gates 112 move from their open to their closed position, and the plunger 114 moves from its first to its second position. The plunger 114 thereby compresses the connector while the gates 112 close to retain the cable and brace the rear of the connector, which aids in compressing the connector onto the cable and prevents the connector from deforming. This helps ensure a good connection between the connector and the cable. Alone, or in combination with the end piece 116 described below, the tool 100 allows a user to compress a connector onto a coaxial cable without requiring as much cable extending into the tool as conventional compression tools. While conventional tools may require an inch or more of cable to extend into the tool, the present invention can compress the connector onto a cable with only about ¼ inch of cable extending into the tool. This is advantageous in a wide variety of situations. For example, when only a short piece of cable extends from a wall or face place.

The second compression station 130 includes the same relative components as the first compression station 110, described above, though the components of the preferred station 130 are sized and configured for series 7 and 11 cables and connectors. In all other respects, the components of compression station 130 (i.e., gates 132, plunger 134, end piece 136, opening 138, and channel 140) are the same, and function in the same manner, as the previously-described components of first compression station 110 (i.e., gates 112, plunger 114, end piece 116, opening 118, and channel 120, respectively).

Embodiments of the present invention may include a single compression station, or multiple compression stations to, for example, accommodate connectors and cables of different sizes. Compression tools according to the present invention may include any suitable number of compression stations positioned and oriented in any suitable manner. For compression tool 100, for example, the compression station 110 described above is located at a first end 100A of the compression tool 100, while a second compression station 130 is located at a second (opposite) end 100B of the tool 100. The second compression station 130 is depicted as being inverted relative to the first compression station 110. Compression station 110 and/or compression station 130 could alternately not be inverted, or could be on the same end of the tool 100.

The compression tool 100 includes an actuator 150 in communication with the first compression station 110 and the second compression station 120. The actuator 150 can be moved from a first (open) to a second (closed) position. When the actuator 150 is moved into the second position, it causes (1) the gates 112, 132 to move to their respective closed positions, thereby retaining a coaxial cable in one of the pairs of gates, and (2) simultaneously causes plungers 114, 134 to move to their respective second positions, thereby engaging one with a connector positioned in one of the respective stations, compressing the connector against the gates and onto a cable. When the actuator 150 is then moved from the second position back to the first (open) position, it causes the gates 112, 132 to open and the plunger (either 114 or 134) to disengage from the connector in one of the stations, allowing the user to remove the cable (with connector now attached) from the tool 100.

The actuator 150 may be any system or device suitable for performing the functions described herein. In the preferred embodiment, the actuator is a hand-operated, spring-loaded lever. In this embodiment, a user applies force to the lever 150 to move it from the first (open) position to the second (closed) position to compress a connector onto a cable, and then releases the actuator 150, so it moves to the first (open) position to release the cable.

Figure 13:
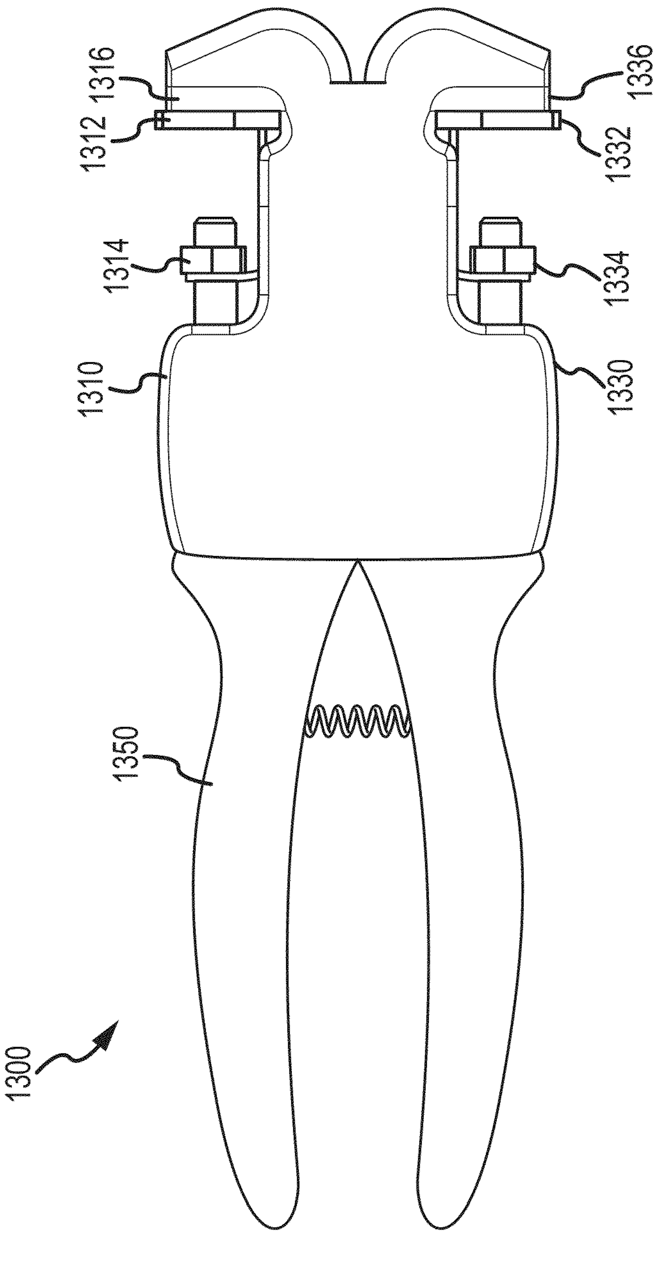
FIG. 13 depicts a side view of another exemplary compression tool according to the present invention.

While compression tool 100 depicts a separate compression station at each end of the tool, a compression tool according to aspects of the present invention may (also or alternatively) include two or more compression stations adjacent to each other. Compression stations may be located on the top, sides, bottom, or any other dimension of a compression of the present invention. For example, referring now to FIG. 13, compression tool 1300 comprises a first compression station 1310 adjacent to a second compression station 1330. The components of compression stations 1310 and 1330 (e.g., gates 1312, 1332, plunger 1314, 1334, endpieces 1316, 1336) function as described above for the corresponding components on compression tool 100. The actuator 1350 in this embodiment comprises a spring-loaded handle. In operation, a user squeezes the handle 1350, compressing it to the second (closed) position and actuating the gates 1312, 1332 and plungers 1314, 1334 in both compression stations 1310, 1330 to compress a connector onto a cable in either (or both) compression stations 1310, 1334. The user then releases the handle 1350, which returns to the first (open) position, thereby retracting the plungers 1314, 1334 and opening the gates 1312, 1332. In this embodiment, compression station 1310 is preferably configured for series 6 and 59 cable, while compression station 1330 is preferably configured for series 7 and 11 cable. This embodiment of the present invention allows a user to compress connectors onto cables of different sizes using a single tool. This embodiment also allows a user to use either compression station 1310, 1330 in the same manner (i.e., by squeezing and releasing the handle 1350).

The particular implementations shown and described above are illustrative of the invention and its best mode and are not intended to limit the scope of the invention in any way. Methods illustrated in the various figures may include additional steps and steps may be performed in any suitable order without departing from the scope of the invention. Changes and modifications may be made to the disclosed embodiments without departing from the scope of the present invention. These and other changes or modifications are intended to be included within the scope of the present invention, as expressed in the appended claims and legal equivalents thereof.

What is claimed is:

1. A tool for compressing a connector onto a coaxial cable, the tool comprising:

a first compression station, including—

(a) a first pair of gates, the gates having an open position and a closed position;

(b) a first plunger for compressing the connector against the gates and onto the coaxial cable, the plunger having an open position and a closed position; and (c) an actuator in communication with the first pair of gates and the first plunger, the actuator having a first position and a second position, wherein the first plunger is in its open position and the first pair of gates are in their open position when the actuator is in its first position, and wherein the first plunger is in its closed position and the first pair of gates are in their closed position when the actuator is in its second position;

(d) whereby when the actuator is moved into its second position:

(i) the first pair of gates are moved to their closed position for retaining the coaxial cable and bracing the connector; and (ii) the actuator engages the first plunger with the connector to compress the connector against the first pair of gates and onto the coaxial cable; and (e) whereby when the actuator is moved into its first position:

(i) the first pair of gates release the coaxial cable; and (ii) the first plunger is disengaged from the connector; and a second compression station, including—

(a) a second pair of gates; and (b) a second plunger for compressing the second connector against the second pair of gates and onto the coaxial cable;

(c) whereby when the actuator is moved into its second position the actuator is configured to:

(i) cause the second pair of gates to retain the coaxial cable and brace the second connector; and (ii) engage the second plunger with the second connector to compress the second connector against the second pair of gates and onto the coaxial cable; and (d) whereby when the actuator is moved into its first position the actuator is configured to:

(i) cause the second pair of gates to release the coaxial cable; and (ii) disengage the second plunger from the second connector.

2. The tool of claim 1, wherein the second compression station is configured to receive a different-sized connector than the first compression station.

3. The tool of claim 1, wherein the first compression station is located at a first end of the tool, and the second compression station is located at a second end of the tool.

4. The tool of claim 1, wherein the first compression station and the second compression station are located at the same end of the tool.

5. The tool of claim 1, wherein each gate has a thickness of about 0.100 inch.

6. The tool of claim 1, wherein each gate comprises a semi-circular portion, and wherein the second pair of gates are configured to at least partially surround the coaxial cable when the actuator is moved into the second position.

7. The tool of claim 1, wherein the actuator is a spring-loaded lever.

8. The tool of claim 1, wherein the second compression station further comprises a second elongated body defining a second channel having a proximal end and a distal end, wherein the second channel is configured to receive the coaxial cable and the second connector, and wherein the second plunger is positioned at the proximal end of the second channel and the second pair of gates are positioned at the distal end of the second channel.

9. The tool of claim 8, wherein the second compression station further comprises a second end piece at the distal end of the second channel wherein the second end piece comprises an opening for receiving the coaxial cable and further braces the second connector when the second plunger compresses the second connector against the second pair of gates and onto the coaxial cable.

10. The tool of claim 9 wherein a substantially circular opening is defined through the second pair of gates and the second end piece when the actuator is moved into the first position.

11. The tool of claim 8, wherein the second end piece has a thickness of about 0.25 inch.

12. The tool of claim 8, wherein each gate of the second gates is pivotably attached to the second end piece.

13. The tool of claim 8, wherein a portion of the opening in the second end piece is semi-circular and each gate of the second pair of gates comprises a semi-circular portion.

14. The tool of claim 13 wherein two or more of the plurality of compression stations are disposed at one end of the tool.

15. The tool of claim 13 wherein at least one of the plurality of compression stations includes a plunger having an opening configured to receive a central conductor of a coaxial cable.

* * * * *